July 24, 1962 R. K. H. GEBEL 3,046,331

SUPERVISORY COMMUNICATION SYSTEM

Filed Sept. 11, 1959 5 Sheets-Sheet 1

INVENTOR.
RADAMES K.H. GEBEL

BY

Wade Koontz
S. A. Stickell
ATTORNEYS

July 24, 1962 R. K. H. GEBEL 3,046,331

SUPERVISORY COMMUNICATION SYSTEM

Filed Sept. 11, 1959 5 Sheets-Sheet 2

INVENTOR.
RADAMES K.H. GEBEL

BY

Wade Koontz
S.A. Strickland
ATTORNEYS

July 24, 1962 R. K. H. GEBEL 3,046,331

SUPERVISORY COMMUNICATION SYSTEM

Filed Sept. 11, 1959 5 Sheets-Sheet 3

INVENTOR.
RADAMES K.H. GEBEL

BY Wade Koontz
S. A. Strickl... 
ATTORNEYS

INVENTOR.
RADAMES K. H. GEBEL
BY
Wade Koontz
S. A. Strickland
ATTORNEYS

July 24, 1962 R. K. H. GEBEL 3,046,331

SUPERVISORY COMMUNICATION SYSTEM

Filed Sept. 11, 1959 5 Sheets-Sheet 5

INVENTOR.
RADAMES K.H. GEBEL

BY Wade Koontz
S. A. Stickle Jr.
ATTORNEYS 3,046,331

SUPERVISORY COMMUNICATION SYSTEM

Radames K. H. Gebel, Dayton, Ohio, assignor to the United States of America as represented by the Secretary of the Air Force Filed Sept. 11, 1959, Ser. No. 839,542
3 Claims. (Cl. 178—6.8)
(Granted under Title 35, U.S. Code (1952), sec. 266)

The invention described herein may be manufactured and used by or for the United States Government for governmental purposes without payment to me of any royalty thereon.

This invention relates to a communication system and particularly to a television communication system having means for communicating information of a plurality of types with a maximum utilization of transmission equipment.

In the construction and operation of television systems, it is customary to provide a scanning system providing a plurality of sequences of information characters with a line retrace or "fly-back" between each independent sequence of information, the independent sequences being arranged to form a pattern or field and having a field return from the end of the last sequence to the beginning of the first sequence. In the nomenclature of the art, the independent sequences are known as traces and the return interim between traces is known as a retrace or "fly-back." The return from the end of the last sequence to the beginning of the first sequence is commonly called a field return.

In the utilization of these traces to provide a continuous picture on the screen, it is customary to send picture intelligence only on the trace portion. However, it has heretofore been known to send other information such as voice recordings during the interval between traces. See Zworykin 2,146,876, Von Felgel-Farnholz 2,268,001 or Sziklai et al. 2,686,220.

In the control of slave vehicles such as reconnaissance planes or guided missiles, it is customary to provide a scanning device mounted on the slave vehicle or missile to scan the territory toward which the slave vehicle or missile is directed and to return this information to a control station either on the ground or in a mother vehicle, as may be desired. During the operation of the missile it is also necessary for the pilot of the guided missile to have certain vital information concerning the condition of the guided missile.

It has heretofore been customary to provide a second pickup device positioned to view the various instruments indicating the condition of the missile and to provide switching mechanism for connecting one or the other of the pickup devices into the transmitting circuit so that periodically the operator of the guided missile may view the meters and determine the status of the various operating conditions of the missile. However, because of the high velocity of the missile the time necessary to view the inspection sequence is frequently of such duration that the pilot of the missile may lose contact with the target or with any intercepting missiles or vehicles so that the missile may be lost or improperly guided because of the lack of control during the inspection interval.

It is also highly desirable to have further information concerning the target area than that presented by a single picture of the target area. For example, it is frequently desirable to be able to determine particular portions of the target area in sufficient time so that the missile may be properly guided thereto. For example, steel plants and other similar plants have furnaces or the like, which produce infrared radiations that may be picked up by suitable sensitized devices which may be operated or scanned in the same manner as the picture pickup device. Also, it is now possible to pick up, at a distance, the stray flux radiations from such devices as transformers, generating stations and the like.

In accordance with the present invention, a missile communicating system utilizes a single scanning system operating a plurality of pickup devices with the normal picture intelligence being transmitted during the normal trace interval with secondary information being transmitted during the line retrace or "fly-back" period and a third set of information being forwarded during the field return trace. This is accomplished by means of a plurality of pickup devices, one of which will be a normal picture camera which will be connected to a mixer to modulate the carrier during the trace interval to send the black and white picture information, while a second pickup device will be of the information type such as heat or magnetic flux detectors and this second pickup device will be connected to the mixer to modulate the carrier during the "fly-back" interval and the information carried during the fly-back interval will be superimposed, preferably as an overlay, on the picture screen or on the black and white picture so that the location of hot spots or the like may be readily determined with respect to the target.

A third pickup or sensing device will be operatively associated with the instruments of the missile and will be connected to the mixer to modulate the carrier during the field return interval so that the condition of the various components of the missile will be indicated during the field return time so that the continuity of the picture and the overlay thereon will be substantially continuous and the operator will have the advantage of continuous knowledge of the field of target and of the condition of the missile.

The receiving system will preferably utilize a single screen for both the black and white and the additional information overlay so that the location of the hot spots with respect to the target will be constantly available to the missile operator or pilot. Preferably a separate screen or other reproducing device will be provided for the reception of information concerning the meters or instruments in the vehicle and this separate screen may well have a retention characteristic longer than the retention characteristic of a normal screen so that the image of the meter or other instruments will be retained for longer intervals.

When operating slave vehicles it is frequently desirable to maintain surveillance over the back trail to ascertain the presence of pursuing vehicles or missile. A rearwardly looking camera may be mounted in the slave vehicle and suitable switches operated either automatically or manually to selectively couple the various pickup devices such as the second pickup device or the rearward looking pickup device to the mixer, assuming that the trace and retrace intervals are of different time durations as in normal television system, then the forward looking pickup device may be operative to modulate the main trace with the rearward looking pickup device operative to modulate the retrace producing a shadow on the picture. Also as the slave vehicle approaches the target area the rearward looking pickup device may be disconnected and the auxiliary target pickup device connected in its place.

During war conditions it has heretofore been known to provide dummy or camouflage villages or cities which substantially resemble desirable target areas so that missiles may be lost by being aimed at a dummy target. The utilization of secondary information such as the presence of hot spots would help to indicate the falseness of the dummy picture so that the pilot would not waste a missile thereon.

It is accordingly an object of the invention to provide an improved communication system.

It is a further object of the invention to provide a television system transmitting intelligence during all portions of the scanning pattern.

It is a further object of the invention to provide a television system operative to simultaneously provide various information characteristics so that the pilot of a guided missile may have continuous information concerning the target area and the condition of the missile.

Other objects and many of the attendant advantages of this invention will be apparent fom the following detailed description taken in connection with the accompanying drawing in which.

Figure 6:
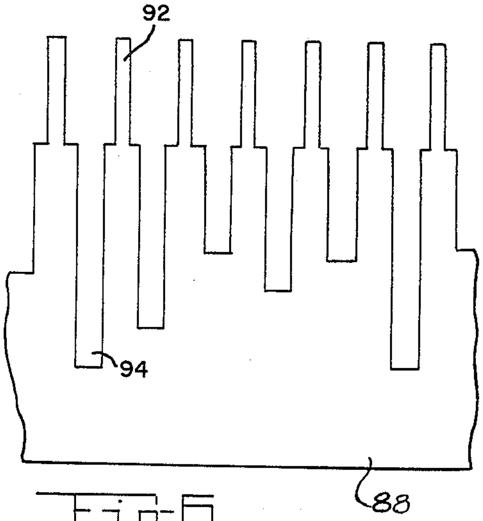
FIG. 6 is a similar graphical view showing positive synchronizing impulses and negative amplitude modulated impulses between the synchronizing impulses.
Figure 7:
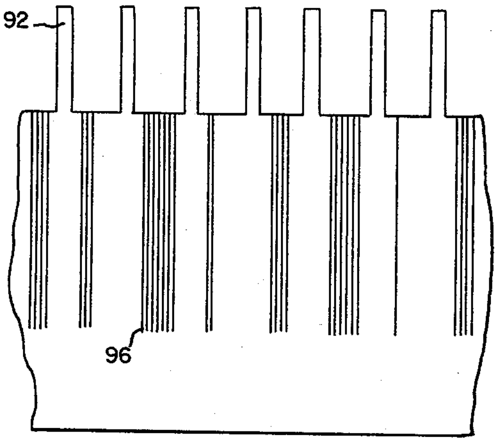
FIG. 7 is a view similar to FIG. 5 showing frequency modulated impulses.
Figure 8:
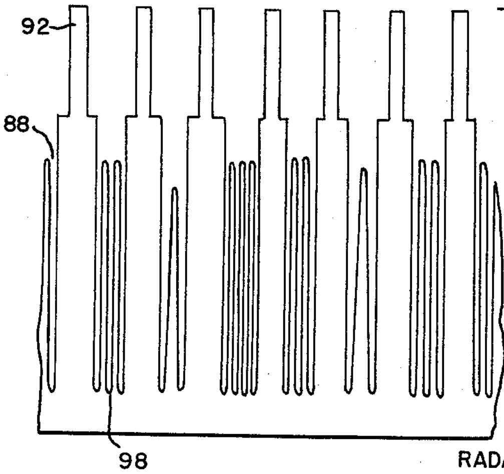
FIG. 8 is a view similar to FIG. 5 showing a frequency modulated wave applied to the field return between the synchronized impulses.
Figure 10:
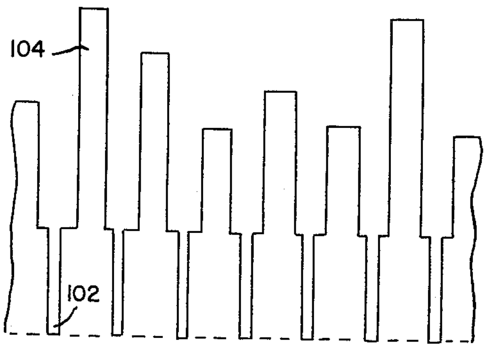
Figure 11:
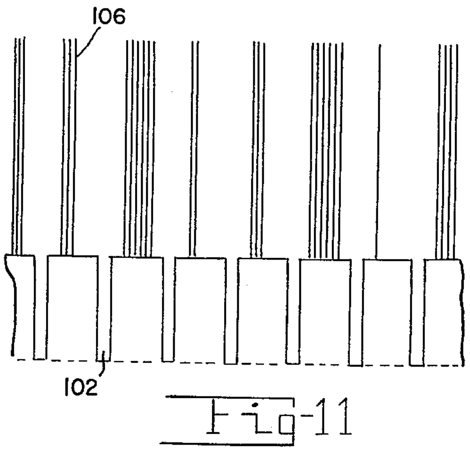
Figure 12:
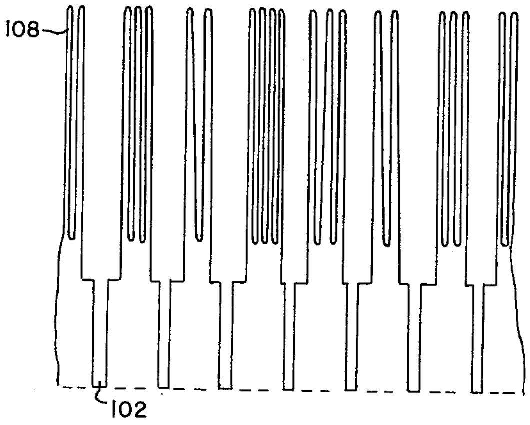

FIGS. 10, 11, and 12 are similar to FIGS. 6, 7, and 8 but show negative synchronizing impulses with positive modulation.

In an illustrative embodiment, according to the invention, a first information pickup device 10, such as a picture camera or iconoscope is mounted in a target seeking vehicle such as a guided missile and a second pickup device 12, such as an infrared pickup device also is mounted in the vehicle, are arranged to be connected to a mixer 26 to modulate the carrier of transmitter 24 in accordance with the information of the first pickup device 10 during the normal trace interval and according to the second pickup device 12 during the retrace, or "fly-back," interval.

A third pickup or sensing device 14 is mounted within the slave vehicle or missile in such manner that it constantly samples the meters or instruments indicating the condition of various portions of the vehicle or missile and is connected to the mixer to modulate the carrier during the field retrace interval.

Figure 1:
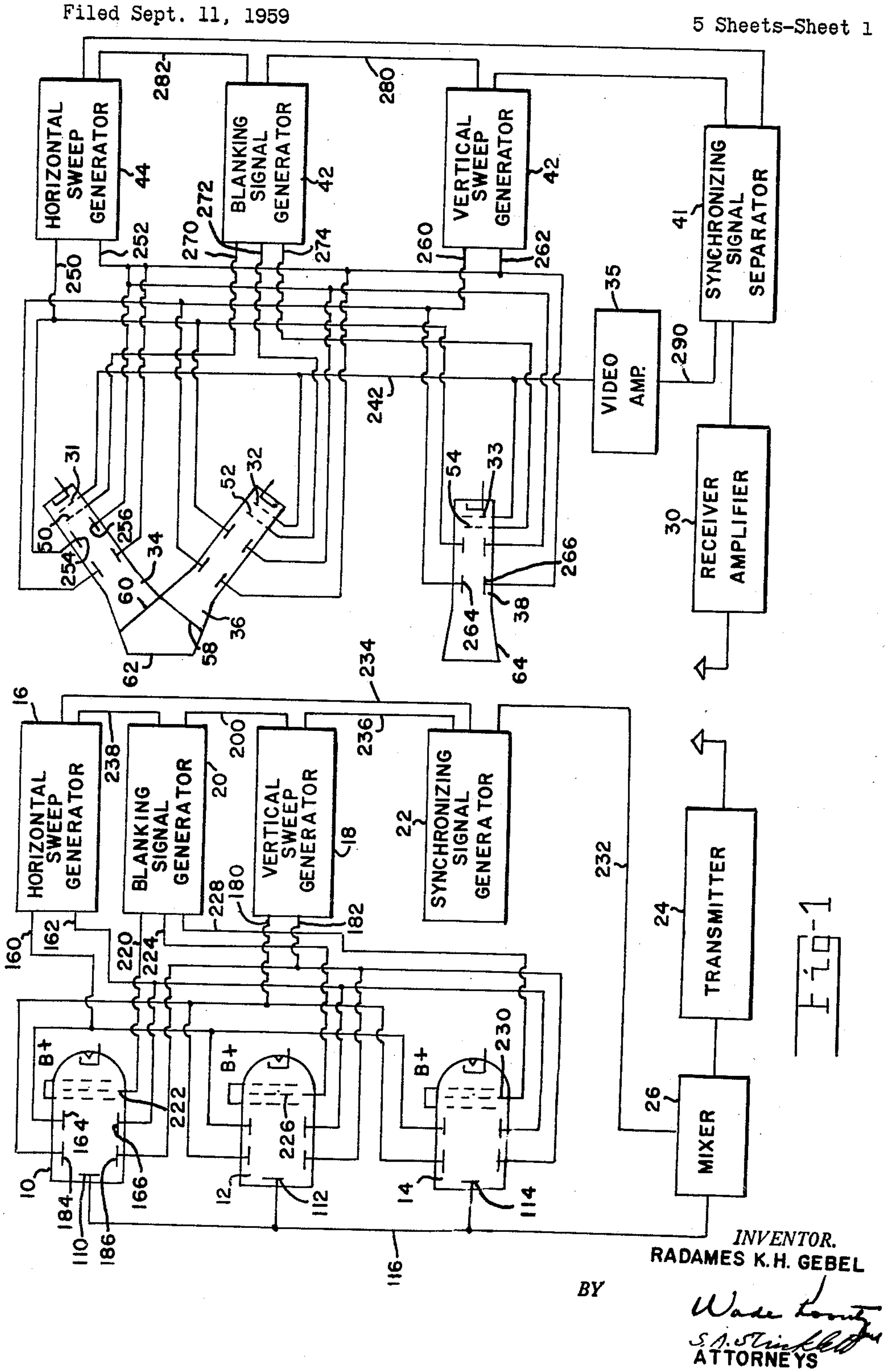
FIG. 1 is a schematic illustration of a communicating system according to the invention.

A scanning control includes a horizontal sweep generator 16 and vertical sweep generator 18 controlled by a synchronizing signal generator 22 which supplies trigger pulses to the sweep generators 16 and 18 and supplies a synchronizing or lock in signal to the mixer 26. The saw tooth sweep generators 16 and 18 simultaneously control the electron beam in each of the pickup devices 10, 12 and 14. A blanking signal generator 20 is responsive to the operation of the sweep generators 16 and 18 to apply blocking impulses to the control grids of the pickup devices 10, 12 and 14. Since the missile carrying the pickup devices 10, 12 and 14 will be traveling at a high rate of speed, the distortion caused by the forward motion of the vehicle renders undesirable, or at least unnecessary, the utilization of interlaced scanning so that normal line sequences scanning, such as shown in Zworykin Patent 2,146,876 produces a highly desirable trace pattern as shown in FIGS. 1, 5A and 5B. This pattern, consisting of trace, retrace and synchronizing signals, is highly desirable in the present system. The output of the pickup devices 10, 12 and 14, as received by the signal plates 110, 112 and 114 are connected in parallel to a conductor 116 which applies the total output signal to the mixer 26. As will be pointed out hereinafter the blanking signal generator 20 selectively blanks the pickup devices 10, 12 and 14 so that only one of these pickup devices will be operative at any given time. The output of the pickup devices 10, 12 and 14 and the synchronizing signal of the generator 22 will be impressed on transmitter 24 by means of mixer 26 to modulate the carrier wave generated and transmitted by the transmitter 24.

The modulated carrier is received by the receiver amplifier 30 at the control station for the missile and the modulation applied in parallel to the beam intensity control grids 32 of picture tubes 34, 36 and 38. The synchronizing signal will be taken from the carrier by the synchronizing signal separator 41 and applied to a horizontal sweep generator 44 and a vertical sweep generator 46, which in turn controls blanking signal generator 42.

The pickup devices 10, 12 and 14 may be of any desired type, but preferably one of the pickup devices such as 10 is a picture camera producing modulation of a standard picture type and another, such as 12, is responsive to a condition such as temperature, magnetic flux radiation, or the like within the area covered by the picture device 10.

The horizontal sweep generator 16 is provided with terminals 160 and 162, which are connected to the horizontal deflection plates 164 and 166 of each of the pickup devices 10, 12 and 14. Likewise, the vertical sweep generator 18 is provided with terminals 180 and 182, which are connected to the deflection plates 184 and 186 of each of the pickup devices. The blanking signal generator 20 is provided with a terminal 220 which is connected to the blanking grid 222 of pickup device 10, terminal 224 connected to the control grid 226 of pickup device 12 and terminal 228 connected to the blocking grid 230 of pickup device 14. Synchronizing signal generator 22 supplies synchronizing impulses over the conductor 232 to the mixer 26, supplies synchronizing impulses to the horizontal sweep generator 16 over conductor 234 and to vertical sweep generator 18 over conductor 236. The blanking signal generator 20 will receive control impulses for horizontal sweep generator 16 over conductor 238 and from the vertical sweep generator over conductor 240.

The modulation impressed on the carrier wave of transmitter 24 will be received and amplified by receiver amplifier 30 and passed to the synchronizing signal separator 41 which, as is well known, will clip the incoming signals and pass the synchronizing signals to the vertical sweep generator 46 and the horizontal sweep generator 44 while the video signals will be transmitted to video amplifier 35. The amplified video signal will be transmitted by conductor 242 to the intensity control grid 31 of reproduction device or kinescope 34. Also, to intensity control grid 32 of reproduction device 36 and intensity control grid 33 of reproduction device 38. Horizontal sweep generator 44 is provided with terminals 250 and 252 connected to the horizontal deflection plates 254 and 256 of each of the reproduction devices 34, 36 and 38. The vertical sweep generator 46 is provided with output terminals 260 and 262 which are connected to the deflection plates 264 and 266 of each of the reproduction devices 34, 36 and 38 so that simultaneous sweeping occurs in each of the reproduction devices.

Figure 2:
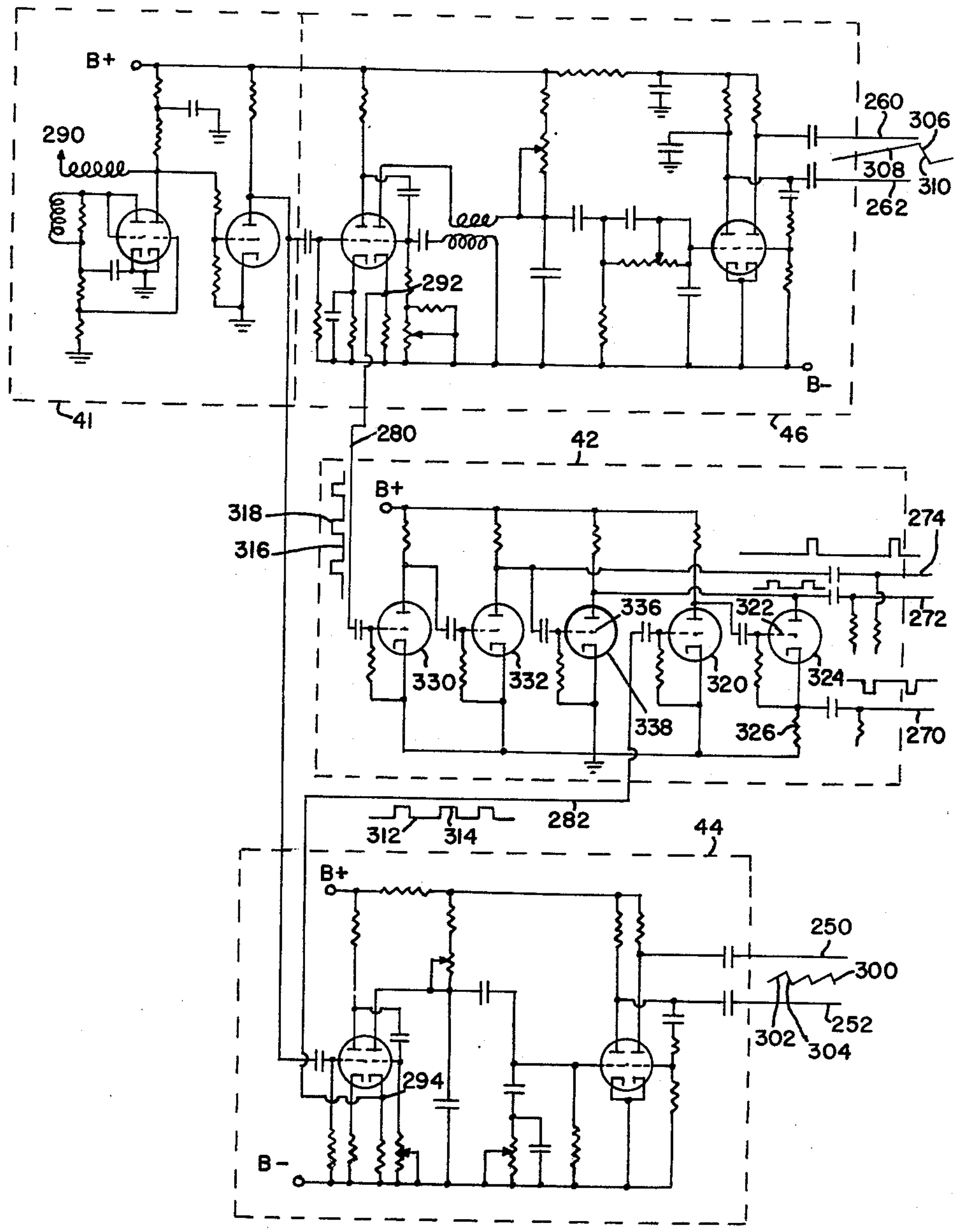
FIG. 2 is a schematic diagram of one type of scanning and blocking control.

Blanking signal generator 42 is provided with output terminal 270 connected to blanking grid 50 of reproduction device 34. Terminal 272 connected to the blanking grid 52 of reproduction device 36 and terminal 274, connected to the blanking grid 54 of reproduction device 38. The blanking signal generator 42 receives control impulse over conductor 280 from the vertical sweep generator 46 and over conductor 282 from the horizontal sweep generator 44. The synchronizing signal separator 41 may be of any desired type which is herein illustrated in FIG. 2 as a clipper removing the synchronizing signal and feeding them to the vertical and horizontal saw tooth wave generators 46 and 44 while feeding the video signal through terminal 290 to the video amplifier 35. Obviously any of the well known saw tooth wave generators may be utilized, but for simplicity of illustration the old and well known oscillator controlled saw tooth wave generators are illustrated with a take off terminal 292 in the vertical sweep generator and a take off terminal 294 in the horizontal sweep generator.

The blanking system 42 is responsive to horizontal sweep wave 300, having the trace portion 302 and retrace 304, and to vertical sweep wave 306, having the control portion 308 and field return portion 310. The output square wave at terminal 294 has the negative portion 312 during trace period 302 and positive portion 314 during retrace time 304. Likewise, the output square wave at terminal 292 has the negative portion 316 during field trace 308, and the positive portion 318 during the field return 310. To secure phase reversal, the output of the horizontal saw tooth generator 44 is passed through phase inverter tube 320, which applies the inverted phase potential to grid 322 of tube 324 so that during field trace 308, tube 324 is conducting during forward trace 302 and the positive voltage across resistor 326 is applied over conductor 270 to blanking grid 50 rendering tube 34 conducting during the trace 302. Then during the fly-back 304, the tube 324 is off, applying positive potential over conductor 272 to grid 52. During field trace 308, inverter tube 330 is off making tube 332 off and maintaining grid 54 negative. During the field return trace 310, the inverter tube 330 is on, turning tube 332 off, so that positive potential is applied to grid 54 over conductor 274 and the positive potential at the anode of tube 332 is supplied to the grid 336 of tube 335, which shorts out tube 324, rendering both grids 50 and 52 negative during the field return interval.

The pickup devices 10, 12 and 14 may be any suitable type of cathode ray pickup device. Preferably pickup device 10 is a standard black and white picture camera or inconoscope having the cathode beam controlled by electrostatic deflection plates and having a mosaic and lens system responsive to ordinary light. The device 12 is of similar construction, but preferably is provided with a mosaic and lens system responsive to infrared radiation. However, devices sensitive to other types of radiation, such as electromagnetic or ultra violet, could obviously be used. The pickup device 14 may be an ordinary iconoscope. However, it is preferred to build a special pickup device having a relatively narrow mosaic, which is swept by the field return. Also, it is possible to utilize other types of pickup devices, such as storage tubes or tubes in which the mosaics are charged in response to the position of a meter or other indicator. When a special type of construction of tube is utilized for pickup device 14, it will not be necessary to connect the horizontal sweep to the special tube. Likewise, it may be desirable to focus the electron beam at one end of the mosaic and cause it to sweep across the mosaic in response to the field return after which it will automatically return to its initial setting. It will be apparent that this tube will be blanked at all times, except during the field return interval.

The tube 36 is preferably provided with a contrasting color screen 58 from the screen 60 of the tube 34, for example, the screen 58 may be red. The tubes 34 and 36 are preferably viewed on a single screen 62 in such manner that the images of screens 58 and 60 are seen in superimposed relation so that the pilot of the missile may not only see the target area, but will have further information concerning portions of the area.

The picture tube 38 may, if desired, be focused on a portion of the screen 62, but preferably has a screen 64 separate from the screen 62 and having a longer period of picture retention so that the missile pilot has continuously in view the target information and the missile information.

Since the sensing device 14 is operative during a continuous field return movement of the scanning device it is obvious that the beam must successively sample the various instruments to successively modulate the carrier in response to the indications of the various instruments. The screen 64 may be provided with dials corresponding to the various instruments and the position of the indicators may be reproduced by the information forwarded by the sensing device 14.

Ordinarily each of the pickup devices 10, 12 and 14 will be of the type utilizing an electron gun to provide a stream of electrons which will be traversed over a selected group of photo sensitive mosaics to provide a modulation in proportion to the intensity of the image cast thereon. Also, the reproduction devices 34, 36 and 38 may be of any desired type but will preferably be of the type utilizing a screen having an electron beam projected thereon and positioned by means of suitable scanning devices and the intensity of the modulating current being controlled by the charge on the mosaics of the picture pickup devices. However, it will be apparent that any suitable pickup device or picture reproduction device may be utilized so that a continuous stream of information may be communicated without disturbing the continuity of the information.

The modulation applied to the carrier may be of any desired type, either blacker than black or whiter than white, with the modulation being above or below a basic gray.

Figure 3:
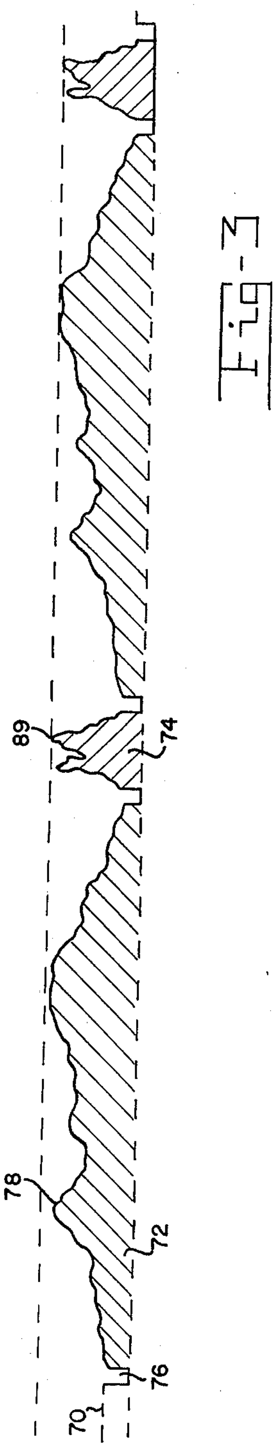
FIG. 3 is a graphical presentation of a carrier having modulation superimposed thereon during both trace and retrace intervals.

As shown in FIG. 3, the carrier 70 is divided into trace portions 72 and retrace portions 74 with synchronizing pulses 76 between the trace and retrace portions. Main picture modulation 78 is applied to the carrier portion 72 and auxiliary information modulation 80 is applied during the retrace portion 74.

The scanning action of both the transmitter and the receiver are controlled by the synchronizing pulses 76 in the manner described in Kallman Patent 2,350,902.

Figure 4:
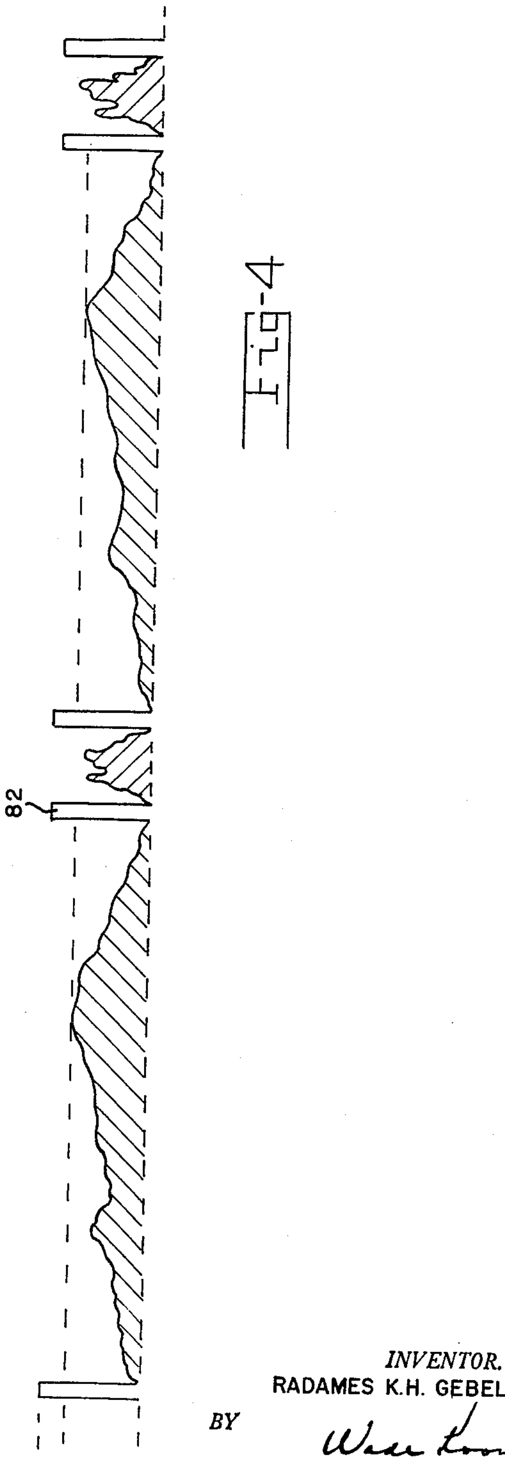
FIG. 4 is a view similar to FIG. 2 but showing negative synchronizing impulses between the trace and retrace intervals.

In the modification according to FIG. 3, the synchronizing pulses 76 are of the positive variety, but negative control impulses 82 may be utilized as shown in FIG. 4.

Obviously the trace and retrace intervals 72 and 74 may be proportioned in any manner desired, but it will usually be desirable to make the retrace interval 74 shorter than the trace interval 72 whereby the main target picture will be of the utmost clarity and definition possible while the overlay will be of considerable less detail.

Because of the utilization of the trace interval 72 and the succeeding retrace 74 to scan the same area, or so-called line sequential scanning, it follows that the information obtained by the auxiliary pickup device 12 will be properly correlated with the information obtained by the primary pickup device 10 even if the slave vehicle be traveling at several times the speed of sound where it is apparent that any material interval between the main and the auxiliary pickup would result in relative dislocation of the information.

Figure 5:
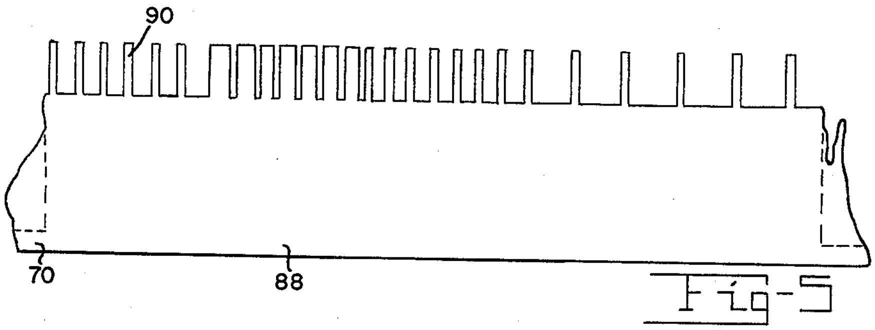
FIG. 5 is a graphical view of a field return portion of a carrier showing positive impulse modulations applied to the retrace portions.

The carrier 70 is also provided with the field return portion 88 carrying positive amplitude modulations as shown at 90 in FIGURE 5.

In the modification according to FIGURE 6, the field return portion 88 is provided with negative synchronizing impulses 92 with the positive modulation pulses 94 between the synchronizing impulses 92.

In the further modification according to FIGURE 7 the modulation is shown as a frequency modulated pulse 96 instead of the amplitude pulses 84. This may be further modified as shown in FIGURE 8 to provide a frequency modulated wave 98 for each of the various instruments or other indicating devices.

Figure 9:
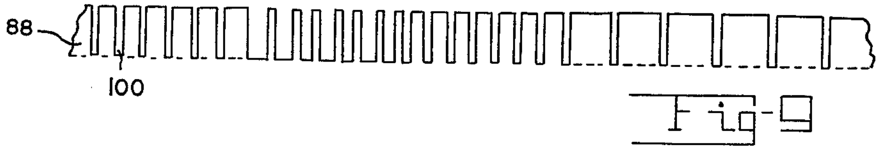
FIG. 9 is a view similar to FIG. 4 but showing negative impulse modulation.

FIGURE 9 shows the use of positive modulation 100 during the field return intervals.

FIGURES 10 and 12 show the use of positive synchronizing impulses 102, with FIGURE 10 having amplitude modulated impulses 104 interposed between the positive synchronizing pulses 102, FIGURE 11 having frequency modulated impulses 106 and FIGURE 12 having frequency modulated waves 108.

As regards the application of the modulation to the vertical field return interval by the sensing device 14, it should be noted that in current domestic practice vertical field return consumes a time corresponding to 26 lines. For military purposes especially, this time could be increased if desirable. In various systems this time is subdivided by a series of very brief synchronizing pulses 92 and 102 applied for the purpose of locking the system components into synchronism. The choice of these pulses depends upon convenience in the choice of circuit elements. The width, waveform and even the sub-intervals of these synchronizing pulses 92 and 102 may be varied widely depending upon the choice of circuit elements. Assuming that it were sufficient and desirable to follow current practice in which pulses 92 and 102 of trace frequency are maintained during vertical retrace or field return, there would be available 25 quiescent intervals between pulses each suitable for transmission of any data applicable to the project at hand or pulses may be applied on vertical synchronizing pulses themselves. These data, conveyed to the receiving station (perhaps depths of the voltage between pulses) could be separated by a suitable commutator and presented as 25 or more essentially continuous sets of data arriving at field, frame or lower intervals.

As a specific example of a military project, a guided missile equipped with the system and using but one transmitter could return to a suitable base, in addition to complete black and white and color presentation of the viewed scene as it appeared from the missile, on the same channel, information as to the orientation of the missile, orientation of the field of view, bearing altitude and speed of the missile, ambient or skin temperatures, pressure, humidity, atmosphere composition, visibility or brightness, fuel supply and consumption, other factors in engine performance, in brief, any data for which appropriate instrumentation had been supplied. These data could be applied to comparison or control mechanisms interval to the missile such that flight of the missile or the viewing angle could be controlled to the end that, for example, correspondence could be obtained between a previously obtained map photograph or motion picture presentation of the target so as to lead the missile to its objective; the receiving station either participating in the control or witnessing the successful culmination of the flight.

It should be noted that in the absence of information as to the actual connection of instruments or controls, which might be available from inspection of a captured unexploded missile, it would be extremely difficult for an enemy to detect, interpret or evaluate the instrumental intelligence applied as fine structure in what is ordinarily a series of pulses of negligible significance and usually uncritical wave form.

In the operation of the system the slave vehicle will carry the various pickup devices together with a single transmitter and a control system for simultaneously scanning the pickup devices and operatively connecting the pickup devices to transmit intelligence to a pilot station either on the ground or on another vehicle. The pilot station is provided with complete operational controls which are electrically coupled with the control devices of the slave vehicle so that movement of a controller in the pilot station causes actuation of the slave vehicle in the same manner as would occur if the operator were on the slave vehicle, the communication system providing at the pilot station all information necessary for proper operation of the slave vehicle.

It is apparent that the construction provides a maximum of information transmittal with a minimum of weight and space requirements.

For simplicity of disclosure, a preferred embodiment of the invention has been disclosed and described according to the best present understanding thereof. However, it will be apparent to those skilled in the art that various changes and modifications in the construction and arrangement of the parts thereof may be readily resorted to without departing from the true spirit and scope of the invention.

What I claim is:

1. A communication system comprising a transmitter, a mixer connected to said transmitter, a plurality of modulation producing devices connected in parallel to said mixer, said modulation producing devices including a picture pickup device, an auxiliary pickup device viewing the area viewed by said picture pickup device, and a sensing device, sweep generator means operative to simultaneously produce a field pattern in each of said pickup devices, said field pattern including trace, retrace and field return sequences, said mixer device being operative to apply the outputs of said pickup devices and said sensing device in modulating relation to a carrier produced by said transmitter, a blanking signal generator for producing a blanking signal for each of said modulation producing devices, said blanking signal generator being connected in controlling relation to each of said pickup devices and said sensing device, said blanking signal generator being operative to blank said picture pickup device during the retrace sequences of the field pattern, to blank the auxiliary pickup device during the trace sequences of the field pattern, to blank said sensing device during the trace and retrace sequences of the field pattern and to blank the picture pickup device and the auxiliary pickup device during the field return sequence of the pattern whereby said modulation producing devices provide modulation in predetermined relation.

2. A missile communication system comprising a transmitter, a plurality of modulation producing devices including a picture pickup device, an auxiliary pickup device viewing the area viewed by said picture pickup device and a sensing device, sweep generator means operative to produce a field pattern trace, retrace and field return sequences in each of said pickup devices, a mixer device connected between said modulation producing devices and said transmitter, said mixer being operative to apply the output of said pickup devices and said sensing device in modulating relation to a carrier produced by said transmitter, a blanking signal generator including means for producing a blanking signal for each of said modulation producing devices, said blanking signal generator being connected in controlling relation to each of said pickup devices and said sensing device, said blanking signal generator being operative to blank the sensing device during the normal field portion of the pattern, to blank said auxiliary pickup device during the trace sequences of the normal field portion of the pattern and to blank the picture pickup device and the auxiliary pickup device during the field return sequences, a receiver, display means including a picture tube, a color picture tube and an independent picture tube, an intensity control means for each of said picture tubes, said control means being connected to said receiver in parallel, a blanking electrode in each of said picture tubes, a blanking signal producer providing a blanking signal for each of said picture tubes, means for impressing the output of said blanking signal producer on said blanking electrodes for actuating said picture tube in accordance with the modulation produced by said picture pickup device, for actuating said color tube in accordance with the modulation produced by said auxiliary pickup device, means for presenting the presentations of said picture tube and said color tube as a single composite view, and for actuating said independent tube in accordance with the modulation provided by said sensing device.

3. For use with a guided missile having a plurality of indicating devices thereon, a communication system comprising a transmitter mounted in said missile for transmitting a carrier wave, a first cathode ray picture pickup device, a second cathode ray picture pickup device, said first and second picture pickup devices viewing substantially the same picture area, a cathode ray sensing device responsive to said indicating devices, means operative to simultaneously produce a field pattern including trace, retrace and field return sequences in each of said pickup and sensing devices, a mixer device connected to modulate the carrier wave of said transmitter by the output of said picture pickup devices and said sensing device, a blanking signal generator connected to said pickup devices and said sensing device, said generator providing blanking potential for each of said pickup devices and said sensing device, circuit means connecting said generator to said pickup devices and said sensing device for applying blanking potential to blank said first picture pickup device during the retrace and field return intervals, to blank said second picture pickup device during the trace and field return intervals, and to blank said sensing device during the field interval of the pattern and a synchronizing signal generator connected to said field pattern producing means and said blanking signal generator for controlling the operation thereof and to said transmitter for providing synchronizing impulses between the trace and retrace intervals.

References Cited in the file of this patent

UNITED STATES PATENTS

| | | |
|---|---|---|
| 2,527,967 | Schrader | Oct. 31, 1950 |
| 2,578,939 | Moran | Dec. 18, 1951 |
| 2,686,220 | Sziklai | Aug. 10, 1954 |
| 2,874,213 | Beers | Feb. 17, 1959 |